United States Patent [19]

Shimizu et al.

[11] Patent Number: 4,934,791
[45] Date of Patent: Jun. 19, 1990

[54] COLOR FILTER

[75] Inventors: Tokihiko Shimizu, Nara; Kesanao Kobayashi, Shizuoka, both of Japan

[73] Assignee: Matsushita Electric Industrial Co., Ltd., Osaka, Japan

[21] Appl. No.: 279,991

[22] Filed: Dec. 5, 1988

[30] Foreign Application Priority Data

Dec. 9, 1987 [JP] Japan .................................. 62-311515
Apr. 5, 1988 [JP] Japan .................................. 63-83337

[51] Int. Cl.$^5$ ........................... G02B 1/04; G02B 5/22; G03C 1/68
[52] U.S. Cl. ................................ 350/317; 350/339 R; 252/582
[58] Field of Search ................. 350/317, 339; 252/582

[56] References Cited
FOREIGN PATENT DOCUMENTS 51-48516 12/1976 Japan .
53-133428 11/1978 Japan .
57-6096 2/1982 Japan .
59-1281 1/1984 Japan .
60-237403 11/1985 Japan .

Primary Examiner—Jon W. Henry
Attorney, Agent, or Firm—Stevens, Davis, Miller & Mosher

[57] ABSTRACT

A color filter prepared by providing red, green and blue picture elements and a black matrix, all comprising a photosensitive resin and a pigment, on a transparent substrate and a transparent electrode layer on the surface, wherein said photosensitive resin comprises a polyfunctional acrylate monomer, an organic polymer binder and a photopolymerization initiator composed of at least one member selected from the group consisting of halomethyloxadiazole compounds and halomethyltriazine compounds.

The color filter provided herein gives a pattern having a high precision and a high surface smoothness owing to the photosensitive resin and exhibits a good environment resistance owing to the pigment.

18 Claims, 4 Drawing Sheets

— NTSC
● PRODUCT OF THE PRESENT INVENTION
○ PRIOR ART PRODUCT

FIG. 4

COLOR FILTER

BACKGROUND OF THE INVENTION

The present invention relates to a color filter suitable for a combined use with a liquid crystal or an image sensor. The color filter of the invention can be used for a display and image scanner in a television receiver, video monitor or computer, etc. In the prior art, a color liquid crystal display formed by a liquid crystal for controlling the transmission or reflection of light and a color filter, has the color filter prepared by forming red, green and blue picture elements and a black matrix on a glass substrate by means of a dyeing process, a printing process or the like. Particularly when an image of high precision is required, a color filter prepared by a dyeing process is mainly used. A color image scanner also has a color filter formed in the same manner as above. However, prior color filters have had the following problems.

A color filter prepared by the dyeing process is prepared by dyeing a natural photosensitive resin such as gelatine and the like or a photosensitive synthetic resin such as amine-modified polyvinyl alcohol and the like with a dye such as acid dye on dyeing substrate. However, this type of color filter is unsatisfactory in reliability in its light resistance, heat resistance, moisture resistance, etc. On the other hand, color filters prepared by printing process are produced by the use of an ink prepared by dispersing a pigment into a thermosetting resin or an ultraviolet-curable resin, and this type of color filter is unsatisfactory in its ability to give a pattern of high precision and in attaining a surface smoothness of surface. Although Japanese patent application Kokai (Laid-Open) No. 60-237,403 discloses a color filter prepared by dispersing a pigment into a photosensitive a polyimide resin, polyimide resin is disadvantageous in that an absorption appears in the visible region to deteriorate the color reproducibility when its thickness exceeds 1.0 micron. Particularly when the field strength and light path length of a cell gap must be varied by changing the thicknesses of red, green and blue picture elements (hereinafter referred to as "multi-gap") in order to improve the contrast, it is difficult to realize a color reproducibility comparable to that of CRT (cathode ray tube).

As to the photo-polymerization initiator for photosensitive resins, polycyclic quinone compounds such as anthraquinone, naphthoquinone and the like have hitherto been used. However, they are practically disadvantageous in that they are low in sensitivity and particularly when a pigment is present the picture element formation by light irradiation takes a long period of time.

If pigment concentration is enhanced in order to achieve a good color reproducibility, no satisfactory polymer can be obtained by light irradiation only, so that the product is poor in adhesive property, cannot form a clear image upon development, and is low in environmental reliability. Although a dispersion composition prepared by dispersing a pigment into a natural photosensitive resin or a photosensitive polyvinyl alcohol resin was also proposed, it was inferior in resolution and, sensitivity, as well as stability in dispersion of the pigment. Further, a color filter made from such a dispersion composition was inferior in heat resistance and moisture resistance.

If a pigment is dispersed as it is, it is difficult to disperse the pigment finely because of agglomeration, association, etc. of the pigment in the dispersion. If it is again dispersed, the pigment again agglomerates, so that the stability of the dispersion is not good enough.

If, in the electrode structure of color filter, a transparent electrode such as ITO (indium tin oxide) or the like is provided on a transparent substrate such as a glass substrate and a color filter is constructed thereon, the insulating layer lowers the voltage, so that a higher voltage must be applied to the panel in order to achieve the desired liquid crystal panel characteristics. Particularly in the case of a multi-gap panel, it becomes impossible to vary the voltage in accordance with picture elements of red, green and blue. Further, another problem occurs in that, when a TFT element (thin-film transistor element) composed of amorphous silicon is used, the light must be screened, and therefore the concentration of pigment such as carbon in the black matrix must be enhanced sometimes. In such a case, that part becomes different from other picture elements in its insulating property, which is disadvantageous.

SUMMARY OF THE INVENTION

An object of the present invention is to provide a color filter which produces a pattern having a high precision and a high surface smoothness from a photosensitive resin and exhibiting a good environmental resistance due to pigment.

In order to achieve the above-mentioned object, the color filter of the present invention is so constructed that red, green and blue picture elements and a black matrix, all comprising a photosensitive resin and a pigment, are provided on a transparent substrate and further a transparent electrode layer is provided on the surface. Said photosensitive resin is a composition comprising a polyfunctional acrylate monomer, an organic polymer binder and a photopolymerization initiator composed of at least one member selected from the group consisting of halomethyloxadiazole compounds and halo- methyl-s-triazine compounds. Further, in order to make electrical properties, heat resistance and bonding property more stable, it is also possible to incorporate an ionic impurity scavenger composed of an epoxy group containing organic compound into the above-mentioned composition.

BRIEF DESCRIPTION OF DRAWINGS

FIG. 4 shows curves illustrating the change of $I_{ON}$ in the lapse of time; wherein 1 is transparent substrate, 2 is color filter, 3 is aligning film, 4 is TFT driving part, and 5 is TN (twisted nematic) liquid crystal.

DETAILED DESCRIPTION OF THE INVENTION

Figure 1:
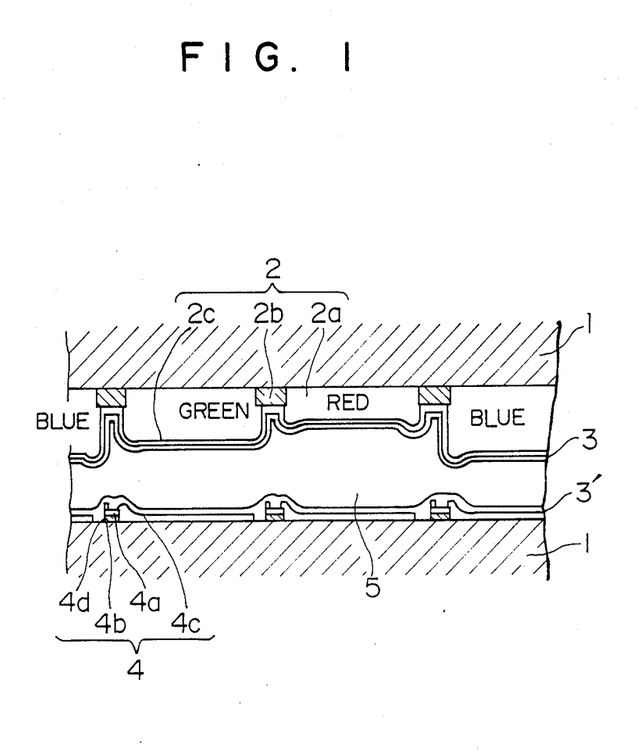
FIG. 1 is a sectional view of a liquid crystal display panel using the color filter of the invention.

FIG. 1 illustrates a sectional view of a panel structure using the color filter of the invention, wherein 1 and 1' are transparent substrates made of glass or plastic such as acrylic resin or the like; 2 is a color filter constituted from red, green and blue picture elements 2a comprising a photosensitive resin and a pigment, black matrix 2b and a transparent electrode layer 2c made of ITO or the like; 3 and 3' are aligning films made of polyimide or the like; 4 is TFT driving part constituted from transistor 4a, source line 4b, counter transparent electrode 4c and gate electrode 4d; and 5 is TN liquid crystal. Further, a polarized light filter is provided on the surface of the transparent substrate opposite to the surface contacted with the liquid crystal. Next, examples of the materials constituting the color filter will be mentioned. As to the photosensitive resin, a fundamental composition comprising a polyfunctional acrylate or methacrylate monomer which is a polymerizable compound having an ethylenically unsaturated bond, an organic polymer binder for giving chemical characteristics such as heat resistance, chemical resistance and the like and mechanical characteristics such as surface hardness, volume contraction and the like and a photopolymerization initiator composed of a halomethyloxadiazole compound, halomethyl-s-triazine compound or their composite material can be used. As to said polyfunctional acrylic or methacrylic monomer, the following compounds can be referred to: ethylene glycol diacrylate, triethylene glycol diacrylate, 1,3-butanediol diacrylate, tetramethylene glycol diacrylate, propylene glycol diacrylate, trimethylolpropane triacrylate, trimethylol triacrylate, 1,4-cyclohexanediol diacrylate, pentaerythritol triacrylate, tetraethylene glycol diacrylate, pentaerythritol diacrylate, pentaerythritol tetracrylate, dipentaerythritol triacrylate, dipentaerythritol tetraacrylate, dipentaerythritol hexacrylate, sorbitol triacrylate, sorbitol tetracrylate, sorbitol pentacrylate, sorbitol hexacrylate, tetramethylene glycol dimethacrylate, triethylene glycol dimethacrylate, trimethylolpropane trimethacrylate, trimethylolethane trimethacrylate, ethylene glycol dimethacryatel, 1,3-butanediol dimethacrylate, pentaerythritol dimethacrylate, pentaerythritol trimethacrylate, dipentaerythritol dimethacrylate, sorbitol trimethacrylate, sorbitol tetramethacrylate, bis[p-(3-methacryloxy-2-hydroxypropoxy)phenyl]dimethylmethane, bis[p-(methacryloxyethoxy)phenyl]dimethylmethane, and the like. Apart from these monomers, prepolymers such as dimers and trimers are also effectively usable. Ester compounds formed between other unsaturated carboxylic acids such as itaconic acid, crotonic acid, isocrotonic acid or maleic acid and an aliphatic polyhydric alcohol are also effective. As to the organic polymer binder, copolymers formed from an unsaturated organic acid compound miscible with acrylate monomer such as acrylic acid, methacrylic acid and the like and an unsaturated organic acid ester such as methyl acrylate, ethyl methacrylate, benzyl methacrylate and the like can be referred to. If the organic polymer binder has an acid group such as carboxyl group or the like, it makes possible a water-solution development which is more effective than organic solvent development in economy and safety.

As to the halomethyloxadiazole type photopolymerization initiator, 2-halomethyl-5-vinyl-1,3,4-oxadiazole compounds represented by the following general formula (I) which are mentioned in Japanese Patent Publication No. 57-6096 can be referred to:

(I)

wherein W represents substituted or unsubstituted aryl group, X represents hydrogen atom, alkyl group or aryl group, Y represents fluorine atom, chlorine atom or bromine atom, and n represents an integer of 1 to 3. Concrete examples of this type of photopolymerization initiator include 2-trichloromethyl-5-styryl-1,3,4-oxadiazole, 2-trichloromethyl-5-(p-cyanostyryl)-1,3,4-oxadiazole, 2-trichloromethyl-5-(p-methoxystyryl)-1,3,4-oxadiazole and the like. As to the halomethyl-striazine type photopolymerization initiator, vinylhalomethyl-s-triazine compounds represented by the following general formula (II) which are mentioned in Japanese Patent Publication No. 59-1281, 2-(naphtho-1-yl)-4,6-bis-halomethyl-s-triazine compounds represented by the following general formula (III) which are mentioned in Japanese patent application Kokai (LaidOpen) No. 53-133,428, and 4-(p-aminophenyl)-2,6-di-halomethyl-s-triazine compounds represented by the following general formula (IV) can be referred to:

(II)

wherein Q represents Br or Cl, P represents —CQ$_3$, —NH$_2$, —NHR, —NR$_2$ or —OR (R is phenyl or alkyl group), W represents optionally substituted aromatic or heterocyclic nucleus or a group represented by the following general formula IIA wherein Z is —O— or —S—, (IIA)

(III)

wherein X represents —Br or —Cl, m and n represent an integer of 0 to 3, R is represented by general formula IIIA, R$_1$ is H or OR (R is alkyl, cycloalkyl, alkenyl or aryl group) and R2 is —Cl, —Br, alkyl, alkenyl, aryl or alkoxy group, (IIIA)

-continued wherein $R_1$ and $R_2$ represent —H, alkyl group, substituted alkyl group, aryl group or substituted aryl group or a group of general formula (IVA) or (IVB):

(IVA)

(IVB)

wherein $R_5$, $R_6$ and $R_7$ represent alkyl group, substituted alkyl group, aryl group or substituted aryl group. Examples of said substituted alkyl group and substituted aryl group include aryl groups such as phenyl group and the like, halogen atom, alkoxy group, carbalkoxy group, carbaryloxy group, acyl group, nitro group, dialkylamino group, sulfonyl derivatives and the like; $R_3$ and $R_4$ represent —H, halogen atom, alkyl group or alkoxy group; X and Y represent —Cl or —Br; and m and n represent 0, 1 or 2.

When $R_1$ and $R_2$ taken jointly form a heterocyclic ring composed of non-metallic atoms in conjunction with the nitrogen atom linked therewith, examples of the heterocyclic ring include the followings:

Concrete examples of the compound of general formula (II) include 2,4-bis(trichloromethyl)-6-p-methoxystyryl-s-triazine, 2,4-bis(trichloromethyl)-6(1-p-dimethylaminophenyl-1,3-butadienyl)-s-triazine, 2-trichloromethyl-4-amino-6-p-methoxystyryl-s-triazine and the like.

Concrete examples of the compound of general formula (III) include 2-(naphtho-1-yl)-4,6-bis-trichloromethyl-s-triazine, 2-(4-methoxynaphtho-1-yl)-4,6-bis-trichloromethyl-s-triazine, 2-(4-ethoxynaphtho-1-yl)-4,6-bis-trichloromethyl-s-triazine, 2-(4-butoxynaphtho-1-yl)-4,6-bis-trichloromethyl-s-triazine, 2-[4-(2-methoxyethyl)naphtho-1-yl]-4,6-bis(trichloromethyl)-striazine, 2-[4-(2-ethoxyethyl)naphtho-1-yl]-4,6-bis-trichloromethyl-s-triazine, 2-[4-(2-butoxyethyl)-naphtho-1-yl]-4,6-bis-trichloromethyl-s-triazine, 2-(2-methoxynaphtho-1-yl)-4,6-bis-trichloromethyl-s-triazine, 2-(6-methoxy-5-methylnaphtho-2-yl)-4,6-bis-trichloro-methyl-s-triazine, 2-(6-methoxynaphtho-2-yl)-4,6-bis-trichloromethyl-s-triazine, 2-(5-methoxynaphto-1-yl)-4,6-bis-trichloromethyl-s-triazine, 2-(4,7-dimethoxynaphtho-1-yl) -4,6-bis-trichloromethyl-s-triazine, 2-(6-ethoxynaphtho-2-yl)-4,6-bis-trichloromethyl-striazine, 2-(4,5-dimethoxynaphtho-1-yl)-4,6-bis-trichloromethyl-s-triazine, and the like.

Concrete examples of the compound of general formula (IV) include 4-[p-N,N-di(ethoxycarbonylmethyl)aminophenyl]-2,6-di(trichloromethyl)-s-triazine, 4-(o-methyl-p-N,N-di(ethoxycarbonylmethyl)aminophenyl]-2,6-di-(trichloromethyl)-s-triazine, 4-[p-N,N-di(chloroethyl) aminophenyl]-2,6-di(trichloromethyl)-s-triazine, 4-[o-methyl-p-N,N-di(chloroethyl)aminophenyl]-2,6-di(tri-chloromethyl)-s-triazine, 4-(p-N-chloroethylamino-phenyl)-2,6-di(trichloromethyl)-s-triazine, 4-(p-N-ethoxycarbonylmethylaminophenyl)-2,6-di(trichloro-methyl)-s-triazine, 4-[p-N,N-di(phenyl)aminophenyl]2,6-di(trichloromethyl)-s-triazine, 4-(p-N-chloro-ethylcarbonylaminophenyl)-2,6-di(tri-chloromethyl)-striazine, 4-[p-N-(p-mathoxyphenylcarbonylaminophenyl)2,6-di(trichloromethyl)-s-triazine, 4-[m-N,N-di(ethoxycarbonylmethyl)aminophenyl]-2,6-di(trichloromethyl)-striazine, 4-[m-bromo-p-N,N-(di(ethoxycarbonylmethyl)aminophenyl]-2,6-di(trichloromethyl)-s-triazine, 4[m-chloro-p-N,N-di(ethoxycarbonylmethyl)aminophenyl]2,6-di(trichloromethyl)-s-triazine, 4-[m-fluoro-p-N,N-di(ethoxycarbonylmethyl)aminophenyl]-2,6-di(trichloro-methyl)-s-triazine, 4-[o-bromo-p-N,N-di(ethoxycarbonylmethyl)aminophenyl]-2,6-di(trichloromethyl)-s-triazine, 2,6-di(trichloromethyl)-s-triazine, 4-[o-fluoro-p-N,N-di(ethoxycarbonylmethyl)aminophenyl]-2,6-di(trichloromethyl)-s-triazine, 4-[o-bromo-p-N,N-di(chloroethyl)aminophenyl]-2,6-di(trichloromethyl)-s-triazine, 4-[o-chloro-p-N,N-di(chloroethyl)aminophenyl]-2,6-di(trichloromethyl)-s-triazine, 4-[o-fluoro-p-N,N-di(chloroethyl)aminophenyl]-2,6-di(trichloromethyl)-s-triazine, 4-[m-bromo-p-N,N-di(chloroethyl)aminophenyl]-2,6-di-(trichloromethyl)-s-triazine, 4-[m-chloro-p-N,N-di(-chloroethyl)aminophenyl]-2,6-di(trichloromethyl)-striazine, 4-[m-fluoro-p-N,N-di(chloroethyl)aminophenyl]2,6-di(trichloromethyl)-s-triazine, 4-(m-bromo-p-N-ethoxycarbonylmethylaminophenyl)-2,6-di(tri-chloro-methyl)-s-triazine, 4-(m-chloro-p-N-ethoxycarbonyl-methylaminophenyl)-2,6-di(trichloromethyl)-s-triazine, 4-(m-fluor-p-N-ethoxycarbonylmethylaminophenyl)-2,6-di(trichloromethyl)-s-triazine, 4-(o-bromo-p-N-ethoxy-carbonylmethylaminophenyl)-2,6-di(trichloromethyl)-striazine, 4-(o-chloro-p-N-ethoxycarbonylmethylamino-phenyl)-2,6-di(trichloromethyl)-s-triazine, 4-(o-fluoro-p-N-ethoxycarbonylmethylaminophenyl)-2,6-di(trichloro-methyl)-s-triazine, 4-(m-bromo-p-N-chloroethylaminophenyl)2,6-di(trichloromethyl)-s-triazine, 4-(m-chloro-p-N-chloroethylaminophenyl)-2,6-di(trichloromethyl)-striazine, 4-(m-fluoro-o-N-chloroethylaminophenyl)2,6-di(trichloromethyl)-s-triazine, 4-(o-bromo-p-N-chloroethylaminophenyl)- 2,6-di(trichloromethyl)-s-triazine, 4-(o-chloro-p-N-chloroethylaminophenyl)-2,6-di(trichloromethyl)-s-triazine, 4-(o-fluoro-p-N-chloroethylaminophenyl)-2,6-di(trichloromethyl)-striazine, and the like. Further, when a sensitizer is additionally incorporated into the photopolymerizable composition of the invention, a sensitizer which increases the velocity of photopolymerization when used in combination with the free radical forming agents represented by the general formulas of the invention, i.e. the photopolymerization initiators should be selected. Concrete examples of said sensitizer include benzoin, benzoin methyl ether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methylxanthone, 2-methoxyxanthone, thioxanthone, benzil, dibenzalacetone, p-(dimethylamino)phenyl styryl ketone, p-(dimethylamino)phenyl p-methylstyryl ketone, benzophenone, p-(dimethylamino)benzophenone (or Michler's ketone), p-(diethylamino)benzophenone, benzanthrone and the like, as well as the benzothiazole compounds mentioned in Japanese Patent Publication No. 51-48,516.

As to the red pigment, an anthraquinone pigment or a perylene pigment is used either alone or in the form of a mixture consisting of their at least one member and a disazo type yellow pigment or an isoindoline type yellow pigment are usable. As to the anthraquinone pigment, C. I. Pigment Red 177 is used, and as the perylene pigment C. I. Pigment Red 155 is used, for example. From the viewpoint of color reproducibility, their mixture with C.I. Pigment Yellow 83 or C. I. Pigment Yellow 139 gives a good result. The ratio (by weight) between the red pigment and the yellow pigment is preferably in the range of 100:5 to 100:50. If the ratio is below 100:4, light transmission in the region from 400 nm to 500 nm cannot be lowered, and purity of color cannot be high. If the ratio is above 100:51, the main wavelength shifts to the short wavelength region, so that deviation from NTSC target hue becomes great. When the ratio is in the range of 100:10 to 100:30, a particularly good result is obtained.

As to the green pigment, halogenated phthalocyanine type pigments are used either alone or in combination with disazo yellow pigment or isoindoline type yellow pigment. A good result is given by a combination of C. I. Pigment Green 7, 36 or 37 and C. I. Pigment Yellow 83 or C. I. Pigment Yellow 139. When the ratio (by weight) between the green pigment and the yellow pigment is in the range of 100:5 to 100:40, a good result is obtained. If the ratio is below 100:4, the light transmission in the region from 400 nm to 450 nm cannot be lowered, so that purity of color cannot be enhanced. If the ratio is above 100:41, the main wavelength shifts to the long wavelength region, and the deviation from the NTSC target hue becomes great. The best result is obtained when the ratio is in the range of 100:5 to 100:20. As to the blue pigment, phthalocyanine type pigments are used either alone or in combination with an dioxazine type violet pigment. For example, a good result is given by a combination of C. I. Pigment Blue 15:3 and C. I. Pigment Violet 23. The ratio (by weight) between the blue pigment and the violet pigment is preferably in the range of 100:5 to 100:50. When the ratio is below 100:4, the light transmission in the region from 400 nm to 420 nm cannot be lowered, and the color purity cannot be enhanced. If the ratio is above 100:51, the main wavelength shifts to the long wavelength region, and the deviation from NTSC target hue becomes great. The best result is given when the ratio is in the range of 100:5 to 100:20.

Further, a pigment-containing photosensitive resin improved in dispersibility and dispersion stability can be obtained by using a powdery processed pigment prepared by finely dispersing the above-mentioned pigments into one of acrylic type resin, maleic acid type resin, vinyl chloride-vinyl acetate copolymer resin and ethyl cellulose resin. Particularly, processed pigments using acrylic type resin and ethyl cellulose resin are most desirable with respect to transparency and dispersion stability.

As to the matrix pigment, carbon, titanium black and iron oxide are used either alone or in combination, among which carbon and titanium oxide give a particularly good result. The ratio (by weight) is preferably in the range of 100:5 to 100:40. If the ratio is below 100:4, light transmission in the longer wavelength region becomes great. If the ratio is above 100:41, dispersion stability is not good enough.

The concentration of pigment in the total solid component (pigments of various colors and resin) is preferably in the range of 10% to 45% by weight. If it is below 9.5% by weight, color purity is impractically low, unless the film thickness is increased to 10 microns or above. If it is above 46% by weight, dispersion stability is not good enough. The particularly desirable range of the pigment concentration is 20% to 40% by weight.

When the mean particle diameter of the pigment particle system is smaller than the wavelength of visible light (400 nm to 700 nm) and more preferably smaller than one-half thereof, the light transmission is good enough.

Next, the present invention will be illustrated by way of the following examples. However, the present invention will not be limited only by these examples. Example 1

As to a transparent substrate, a glass substrate washed with neutral detergent, water, isopropyl alcohol and fluorochlorohydrocarbon solvent was used. As to a photosensitive resin, a resin having the following formulation was used.

| | |
|---|---|
| Benzyl methacrylate-metharylic acid copolymer (73/23 by mole) | 30 gr |
| Pentaerythritol tetracrylate | 7.7 gr |
| 4-[p-N,N-di(ethoxycarbonylmethyl)]-2,6-di(trichloromethyl)-s-triazine | 0.3 gr |
| Hydroquinone monomethyl ether | 0.01 gr |
| Ethyl cellosolve acetate | 62 gr |

As to a red coloring material, a mixture consisting of a powdery processed pigment (Colortex Red U3BN, manufactured by Sanyo Shikiso Co., Ltd.) prepared by finely dispersing C. I. Pigment Red 177 into an acrylic type resin and a powdery processed pigment (Colortex Yellow E119, manufactured by Sanyo Shikiso Co., Ltd.) prepared by finely dispersing C. I. Pigment Yellow 83 into ethyl cellulose resin (the net ratio (by weight) between the two pigments was 100:20) was used. As to a green coloring material, a mixture (100:10) consisting of a processed pigment (Colortex Green #403, manufactured by Sanyo Shikiso Co., Ltd.) prepared by treating C. I. Pigment Green 36 with a maleic acid type resin and a processed pigment prepared by treating C. I. Pigment Yellow 83 with ethyl cellulose resin was used. As to a blue color material, a mixture (100:30) consisting of a processed pigment (Colortex Blue UI-822, manufactured by Sanyo Shikiso Co., Ltd.) prepared by treating C. I. Pigment Blue 15:3 with an acrylic type resin and a processed pigment (Colortex Violet #600, manufactured by Sanyo Shikiso Co., Ltd.) prepared by treating C. I. Pigment Violet 23 with a maleic acid type resin was used. As to a black pigment, a mixture (100:30) of carbon and titanium black was used. Each of the coloring materials was kneaded and dispersed together with a photosensitive resin by means of a triple roll mill or the like to prepare a pasty material. After adding ethyl cellosolve acetate thereto, the resulting mixture was dispersed by means of a ball mill to prepare a dispersion. Formulations (ratios by weight) of the dispersions thus obtained are shown in Table 1.

TABLE 1

|  | Resin | Pigment | Solvent |
| --- | --- | --- | --- |
| Red | 14 | 6 | 80 |
| Green | 14 | 6 | 80 |
| Blue | 16 | 4 | 80 |
| Black | 14 | 6 | 80 |

The pigment particle systems herein obtained were dispersed so that the mean particle diameter came to 0.7 micron or below. Particularly, the red pigment particles, green pigment particles and blue pigment particles were dispersed so that their mean particle diameters came to 0.5 micron, 0.3 micron and 0.2 micron, respectively.

The conditions of coating and the conditions of exposure are shown in Table 2.

TABLE 2

|  | Rotation number of spin | Exposure condition |
| --- | --- | --- |
| Picture element |  |  |
| Red | 1,800 RPM | 20 mJ/cm$^2$ |
| Green | 1,500 | 20 |
| Blue | 1,000 | 25 |
| Black | 700 | 30 |

The prebaking process was carried out at a temperature of 80° C. for 15 minutes. The development was carried out with a 1% (by weight) aqueous solution of sodium carbonate. The coating processes of the colors were carried out in the following order: black of the black matrix, followed by red of the picture element, green of the picture element, and blue of the picture element. Thicknesses of the coating layers were as shown in Table 3.

TABLE 3

| Picture element | Thickness of picture element | Thickness of black matrix |
| --- | --- | --- |
| Red | 1.0 μm |  |
| Green | 1.5 |  |
| Blue | 2.0 |  |
| Black |  | 0.8 μm |

Figure 2:
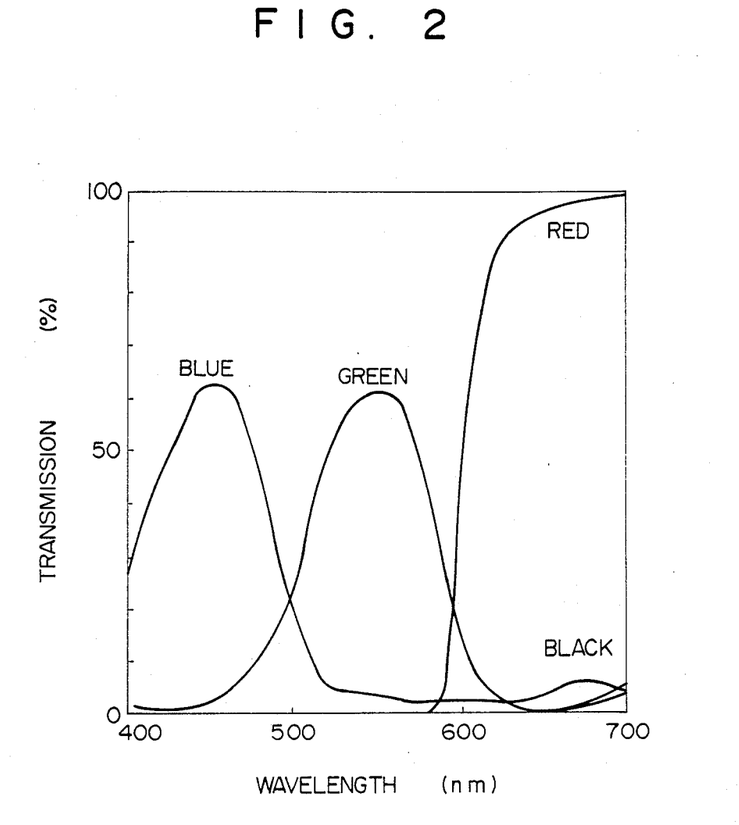
FIG. 2 is a spectral characteristic diagram of the color filter according to one embodiment of the invention.

FIG. 2 illustrates the spectral diagram of the color filter prepared under the above-mentioned conditions.

COMPARATIVE EXAMPLE 1

On a glass substrate having been treated in the same manner employed in Example 1, a photosensitive dyeing base material consisting of 15 parts by weight of low molecular weight gelatin (average molecular weight 10,000), 2 parts by weight of ammonium bichromate, 0.5 part by weight of chromium alum and 82.5 parts by weight of water was coated. It was dyed under the conditions shown in Table 4, using Red 24P (manufactured by Nippon Kayaku Co., Ltd.), Green 1P (manufactured by Nippon Kayaku Co., Ltd.), Blue 5C and Black C. I. 110.

TABLE 4

|  | Condition of coating process (RPM) | Condition of exposure (mJ/cm$^2$) | Condition of dyeing |
| --- | --- | --- | --- |
| Red | 3,000 | 100 | 60° C. (pH 4) |
| Green | 2,500 | 120 | 60° C. (pH 4.5) |
| Blue | 2,000 | 120 | 50° C. (pH 6) |
| Black | 1,000 | 150 | 80° C. (pH 3) |

The prebaking process was carried out at 60° C. for 5 minutes. A color filter was prepared in the order of red, green and blue of the picture element, followed by black matrix. Thicknesses of the coatings were as follows: red 1.0 micron, green 1.5 microns, blue 2.0 microns, black matrix 2.5 microns.

The color filters of Example 1 and Comparative Example 1 were subjected to a light resistance test by means of a Xenon fade meter (FAL-25AX Model HC, manufactured by suga Shikenki Co., Ltd.). In Table 5, the results after 1,000 hours and the results of heat resistance test (170° C., 10 hours) are shown in the term of ΔE according to Lab color expression (CIE 1976 L*a*b* Color Space).

TABLE 5

|  | Light resistance | | | Heat resistance | | |
| --- | --- | --- | --- | --- | --- | --- |
|  | R | G | B | R | G | B |
| Example 1 | 1.7 | 1.0 | 1.2 | 0.3 | 0.1 | 0.2 |
| Comparative Example 1 | 5.8 | 7.3 | 5.2 | 2.1 | 3.4 | 5.9 |

COMPARATIVE EXAMPLE 2

A color filter was prepared, using a photosensitive polyimide resin (Photonees, manufactured by Toray Industries, Inc.). The formulations of the pigments were the same as in Example 1. As the solvent, N-methylpyrrolidone was used. The exposure was carried out by the use of a high pressure mercury lamp in a range of 400 to 600 mj/cm$^2$. The development was carried out with a specific developing agent (DV-140).

Figure 3:
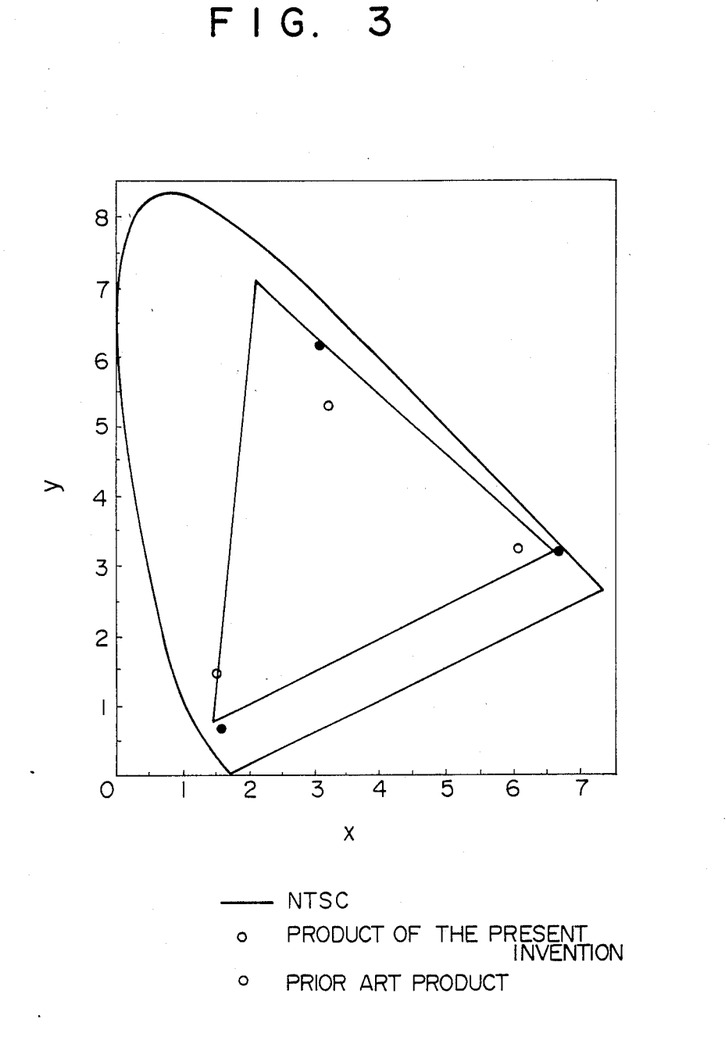
FIG. 3 is its chromaticity diagram.

In FIG. 3, CIE uniform color scale system diagrams of the color filters of Example 1 and Comparative Example 2 are compared with the chromaticity points of NTSC.

Now, as to the method for eliminating the influence of ionic impurities from a color filter, washing with water and heat treatment are considerably effective. It has also been found that the influence of ionic impurities can be suppressed by forming a thin film of an organic or inorganic material on the surface of the color filter, and that compounds capable of reacting with the ionic impurities to form stable compounds are most effective. As the ionic impurity-scavenger, therefore, compounds having an epoxy group are effective. Concrete examples of this type of compound include 2-ethylhexyl glycidyl ether, 2-methyloctyl glycidyl ether, ethylene glycol diglycidyl ether, propylene glycol diglycidyl ether, neopentyl glycol diglycidyl ether, 1,6-hexanediol diglycidyl ether, glycerin diglycidyl ether, trimethylolpropane triglycidyl ether, hydrogenated Bisphenol A diglycidyl ether, and the like. Its preferable amount is 0.1% by weight to 10% by weight based on the total solid component (which is defined as the summed weight of the monomer of the invention, the organic polymer binder and the photopolymerization initiator). If its amount is smaller than 0.1% by weight, no impurity-removing effect can be exhibited. If its amount exceeds 10% by weight, the water-solution development is disturbed. Further, it was also confirmed that the effect of the additive of the invention consists in reacting with the organic acid residue of polyacrylic acid or the like in the organic polymer binder of the invention to elevate the crosslinking density and thereby improving heat resistance and adhesive property onto glass substrate.

EXAMPLE 2

The resin shown in Table 1 of Example 1 (its amount shown in Table 1) was mixed with 2.0% by weight of glycerin diglycidyl ether as an ionic impurity-scavenger. Using the mixture thus obtained, a color filter was prepared under the same conditions as in Example 1. Using the color filters of Example 1 and Example 2, liquid crystal image display panels having the same construction as in FIG. 1 were prepared. The panels thus obtained were subjected to a driving test for 10,000 hours in an atmosphere of 60° C./90% RH. The percent change of $I_{ON}$[leak current of panel measured when TFT (thin-film-transistor element) is "ON]in the lapse of time is shown in FIG. 4.

Generally speaking, when $I_{ON}$ exceeds a critical value, the relation between the transmission of panel and the driving voltage changes to bring about a decrease in the quality of display image. Probably, one of the causes of this phenomenon is the elution of impurities into the liquid crystal.

Figure 4:
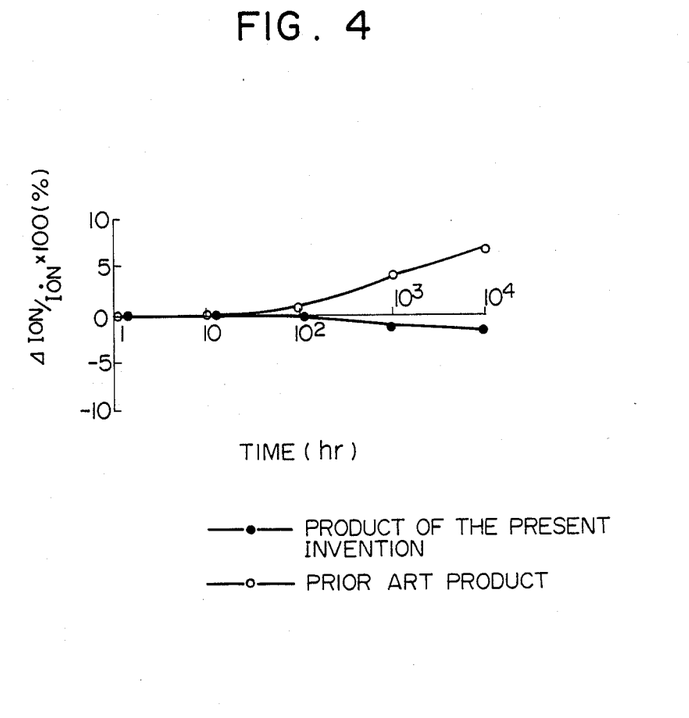

FIG. 4 demonstrates that all the products of the invention satisfy the practical requirement, and their reliability is improved by addition of the additives.

Thus, it is understandable that the products of the present invention are evidently superior to prior products in reliabilities such as color reproducibility, light resistance and heat resistance.

The results given by other material formulation than those above also similar to those above, insofar as the formulation is within the scope of the present invention.

What is claimed is:

1. A color filter prepared by providing red, green and blue picture elements and a black matrix, all comprising a photosensitive resin and a pigment, on a transparent substrate and providing a transparent electrode on the surface, wherein said photosensitive resin comprises a polyfunctional acrylate monomer, an organic polymer binder and a photopolymerization initiator composed of at least one member selected from the group consisting of halomethyloxadiazole type compounds and halomethyl-2-triazine type compounds.

2. A color filter according to claim 1, wherein said pigment is a processed pigment.

3. A color filter according to claim 2, wherein processed pigment is a powdery or pasty product prepared by finely dispersing a pigment into at least one resin selected from the group consisting of acrylic resin, vinyl chloride-vinyl acetate copolymer, maleic acid resin and ethyl cellulose resin.

4. A color filter according to claim 1, wherein said red picture element includes a pigment comprising an anthraquinone type pigment, a perylene type pigment, or a mixture consisting of at least one of them in admixture with a disazo type yellow pigment or an isoindoline type yellow pigment.

5. A color filter according to claim 1, wherein said green picture element includes a pigment comprising a halogenated phthalocyanine type pigment alone or in admixture with a disazo type yellow pigment or an isoindoline type yellow pigment.

6. A color filter according to claim 1, wherein said blue picture element includes a pigment comprising a phthalocyanine type pigment alone or in admixture with a dioxazine type violet pigment.

7. A color filter according to claim 1, wherein said black matrix includes a pigment comprising at least one member selected from the group consisting of carbon, titanium oxide and iron oxide.

8. A color filter according to claim 1, wherein said red picture element includes a pigment comprising C. I. Pigment Red 177, C. I. Pigment Red 155 or a mixture consisting of at least one of them in admixture with C. I. Pigment Yellow 83 or C. I. Pigment Yellow 139.

9. A color filter according to claim 1, wherein said green picture element includes a pigment comprising C. I. Pigment Green 7, C. I. Pigment Green 36, C. I. Pigment Green 37 or a mixture consisting of at least one of them in admixture with C. I. Pigment Yellow 83 or C. I. Pigment Yellow 139.

10. A color filter according to claim 1, wherein said blue picture element includes a pigment comprising C. I. Pigment Blue 15:3, C.I. Pigment Blue 15:6 or a mixture consisting of at least one of them in admixture with C. I. Pigment Violet 23.

11. A color filter according to claim 1, wherein said pigment has a mean particle diameter smaller than the wavelength of visible light (400 nm to 700 nm).

12. A color filter according to claim 1, wherein the total solid component comprises the pigments of various colors and the resin and the pigment concentration in the total solid component is in the range from 10% by weight to 45% by weight.

13. A color filter according to claim 1, wherein the total solid component comprises the pigments of various colors and the resin and the total solid component contains an ionic impurity-scavenger.

14. A color filter according to claim 13, wherein said ionic impurity-scavenger is an organic compound having an epoxy group.

15. A color filter according to claim 13, wherein the concentration of said ionic impurity scavenger in the total solid component is in the range from 0.1% by weight to 10% by weight.

16. A color filter according to claim 1, wherein said organic polymer binder comprises a copolymer having, as its monomer units, an unsaturated organic acid compound and an unsaturated organic acid ester compound 17. A color filter according to claim 16, wherein said unsaturated organic acid is selected from the group consisting of acrylic acid and methacrylic acid.

18. A color filter according to claim 16, wherein said unsaturated organic acid ester is selected from the group consisting of methyl acrylate, ethyl methacrylate and benyl methacrylate.

* * * * *

UNITED STATES PATENT AND TRADEMARK OFFICE
CERTIFICATE OF CORRECTION

PATENT NO. : 4,934,791

DATED : June 19, 1990

INVENTOR(S) : Tokihiko SHIMIZU et al

It is certified that error appears in the above-identified patent and that said Letters Patent is hereby corrected as shown below:

On the title page, item [56] References Cited, add the following references:

2,586,488 2/87 France
      62-96926 5/87 France Signed and Sealed this Seventeenth Day of December, 1991

*Attest:*

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,934,791

DATED : June 19, 1990

INVENTOR(S) : Tokihiko SHIMIZU et al

It is certified that error appears in the above-identified patent and that said Letters Patent is hereby corrected as shown below:

On the title page, item "[73] Assignee:" should read:

"Matsushita Electric Industrial Co.,
Ltd., Osaka, Japan and
Fuji Photo Film Co., Ltd.,
Kanagawa, Japan"

Signed and Sealed this

Seventh Day of April, 1992

Attest:

HARRY F. MANBECK, JR.

Attesting Officer    Commissioner of Patents and Trademarks